United States Patent
Bakke et al.

(10) Patent No.: US 7,114,013 B2
(45) Date of Patent: *Sep. 26, 2006

(54) INTELLIGENT DATA STORAGE MANAGER

(75) Inventors: Mark Alan Bakke, Maple Grove, MN (US); Stephen Henry Blendermann, Boulder, CO (US); Steven Halladay, Superior, CO (US); Steven A. Johnson, Westminster, CO (US); Jeffrey Steven Laughlin, Nederland, CO (US); George Arthur Rudeseal, Boulder, CO (US); Charles Patrick Schafer, Louisville, CO (US); Thomas David West, Boulder, CO (US); Michael C. Wojnar, Lafayette, CO (US)

(73) Assignee: Storage Technology Corporation, Louisville, CO (US)

( * ) Notice: Subject to any disclaimer, the term of this patent is extended or adjusted under 35 U.S.C. 154(b) by 1051 days.

This patent is subject to a terminal disclaimer.

(21) Appl. No.: 09/966,263

(22) Filed: Sep. 28, 2001

(65) Prior Publication Data

US 2002/0032816 A1 Mar. 14, 2002

Related U.S. Application Data

(63) Continuation of application No. 09/232,431, filed on Jan. 15, 1999, now Pat. No. 6,330,621.

(51) Int. Cl.
*G06F 12/00* (2006.01)

(52) U.S. Cl. .............................. 710/5; 710/36; 710/200; 711/114

(58) Field of Classification Search .................. 710/5, 710/36, 200; 711/100, 114; 379/219
See application file for complete search history.

(56) References Cited

U.S. PATENT DOCUMENTS 3,130,387 A 4/1964 Wright et al.
3,699,533 A 10/1972 Hunter (Continued)

FOREIGN PATENT DOCUMENTS

CA 892798 2/1972
CA 907211 8/1972

(Continued)

OTHER PUBLICATIONS

Richard V. Keele, "Optical Storage: Terabytes On–Line for IBM Mainframes", Data/Ware Development, Inc., pp. 68–71, 1988.

(Continued)

*Primary Examiner*—Rehana Perveen
(74) *Attorney, Agent, or Firm*—Wayne P. Bailey

(57) ABSTRACT

The intelligent data storage manager functions to combine the non-homogeneous physical devices contained in a data storage subsystem to create a logical device with new and unique quality of service characteristics that satisfy the criteria for the policies appropriate for the present data object. In particular, if there is presently no logical device that is appropriate for use in storing the present data object, the intelligent data storage manager defines a new logical device using existing physical and/or logical device definitions as component building blocks to provide the appropriate characteristics to satisfy the policy requirements. The intelligent data storage manager uses weighted values that are assigned to each of the presently defined logical devices to produce a best fit solution to the requested policies in an n-dimensional best fit matching algorithm. The resulting logical device definition is then implemented by dynamically interconnecting the logical devices that were used as the components of the newly defined logical device to store the data object.

17 Claims, 2 Drawing Sheets

U.S. PATENT DOCUMENTS

| | | |
|---|---|---|
| 3,806,888 A | 4/1974 | Brickman et al. |
| 3,909,799 A | 9/1975 | Recks et al. |
| 3,949,377 A | 4/1976 | O'Neill, Jr. |
| 3,976,977 A | 8/1976 | Porter et al. |
| 4,021,782 A | 5/1977 | Hoerning |
| 4,040,026 A | 8/1977 | Gernelle |
| 4,054,951 A | 10/1977 | Jackson et al. |
| 4,080,651 A | 3/1978 | Cronshaw et al. |
| 4,080,652 A | 3/1978 | Cronshaw et al. |
| 4,084,234 A | 4/1978 | Calle et al. |
| 4,086,629 A | 4/1978 | Desyllas et al. |
| 4,110,823 A | 8/1978 | Cronshaw et al. |
| 4,123,795 A | 10/1978 | Dean, Jr. et al. |
| 4,126,893 A | 11/1978 | Cronshaw et al. |
| 4,126,894 A | 11/1978 | Cronshaw et al. |
| 4,158,235 A | 6/1979 | Call et al. |
| 4,215,400 A | 7/1980 | Denko |
| 4,228,501 A | 10/1980 | Frissell |
| 4,241,420 A | 12/1980 | Fish et al. |
| 4,246,637 A | 1/1981 | Brown et al. |
| 4,276,595 A | 6/1981 | Brereton et al. |
| 4,298,932 A | 11/1981 | Sams |
| 4,310,883 A | 1/1982 | Clifton et al. |
| 4,318,184 A | 3/1982 | Millett et al. |
| 4,327,408 A | 4/1982 | Frissell et al. |
| 4,412,285 A | 10/1983 | Neches et al. |
| 4,414,644 A | 11/1983 | Tayler |
| 4,533,995 A | 8/1985 | Christian et al. |
| 4,945,429 A | 7/1990 | Munro et al. |
| 4,974,156 A * | 11/1990 | Harding et al. ............. 711/162 |
| 5,131,087 A | 7/1992 | Warr |
| 5,164,909 A | 11/1992 | Leonhardt et al. |
| 5,214,768 A | 5/1993 | Martin et al. |
| 5,303,214 A | 4/1994 | Kulakowski et al. |
| 5,386,516 A | 1/1995 | Monahan et al. |
| 5,388,260 A | 2/1995 | Monahan et al. |
| 5,412,791 A | 5/1995 | Martin et al. |
| 5,430,855 A | 7/1995 | Walsh et al. |
| 5,455,926 A | 10/1995 | Keele et al. |
| 5,475,817 A | 12/1995 | Waldo et al. |
| 5,504,873 A | 4/1996 | Martin et al. |
| 5,506,986 A | 4/1996 | Healy |
| 5,535,322 A | 7/1996 | Hecht |
| 5,537,585 A | 7/1996 | Blickenstaff et al. |
| 5,546,557 A | 8/1996 | Allen et al. |
| 5,560,040 A | 9/1996 | Mizumachi |
| 5,566,331 A | 10/1996 | Irwin, Jr. et al. |
| 5,613,154 A | 3/1997 | Burke et al. |
| 5,619,690 A | 4/1997 | Matsumani et al. |
| 5,625,405 A | 4/1997 | DuLac et al. |
| 5,630,067 A | 5/1997 | Kindell et al. |
| 5,640,510 A | 6/1997 | Hanaoka et al. |
| 5,664,186 A | 9/1997 | Bennett et al. |
| 5,671,439 A | 9/1997 | Klein et al. |
| 5,689,481 A | 11/1997 | Tamura et al. |
| 5,694,550 A | 12/1997 | Takeda et al. |
| 5,710,549 A | 1/1998 | Horst et al. |
| 5,740,362 A | 4/1998 | Buickel et al. |
| 5,751,715 A | 5/1998 | Chan et al. |
| 5,758,050 A | 5/1998 | Brady et al. |
| 5,758,085 A | 5/1998 | Koucheris et al. |
| 5,758,125 A | 5/1998 | Misinai et al. |
| 5,802,258 A | 9/1998 | Chen |
| 5,805,864 A | 9/1998 | Carlson et al. |
| 5,809,285 A | 9/1998 | Hilland |
| 5,828,836 A | 10/1998 | Westwick et al. |
| 5,829,046 A | 10/1998 | Tzelnic et al. |
| 5,829,053 A | 10/1998 | Smith et al. |
| 5,832,527 A | 11/1998 | Kawaguchi |
| 5,838,891 A | 11/1998 | Mizuno et al. |
| 5,845,147 A | 12/1998 | Vishlitzky et al. |
| 5,867,648 A | 2/1999 | Foth et al. |
| 5,881,311 A | 3/1999 | Woods |
| 5,884,046 A | 3/1999 | Antonov |
| 5,890,203 A | 3/1999 | Aoki |
| 5,960,451 A | 9/1999 | Voigt et al. |
| 5,963,971 A | 10/1999 | Fosler et al. |
| 5,996,024 A | 11/1999 | Blumenau |
| 6,111,944 A | 8/2000 | Molin |
| 6,128,717 A * | 10/2000 | Harrison et al. ............. 711/202 |
| 6,141,729 A | 10/2000 | Ishida et al. |
| 6,457,139 B1 * | 9/2002 | D'Errico et al. ............... 714/5 |

FOREIGN PATENT DOCUMENTS

| | | |
|---|---|---|
| EP | 0 535 922 A2 | 4/1993 |
| EP | 0 689 125 A | 12/1995 |
| GB | 1167762 | 10/1969 |
| GB | 1353770 | 5/1974 |
| GB | 1359662 | 10/1974 |
| GB | 1496779 | 1/1978 |
| GB | 1496780 | 1/1978 |
| GB | 1547381 | 6/1979 |
| GB | 2063532 | 6/1981 |
| JP | 51-18409 | 2/1976 |
| JP | 52-106641 | 9/1977 |
| JP | 53-22331 | 3/1978 |
| JP | 53-84632 | 7/1978 |
| JP | 53-98741 | 8/1978 |
| JP | 53-108747 | 9/1978 |
| JP | 55-153058 | 11/1980 |
| JP | 55-164958 | 12/1980 |
| JP | 4-48250 | 6/1992 |
| WO | 98 40810 A | 7/1992 |
| WO | 97 07461 A | 2/1997 |
| WO | 98 33113 | 7/1998 |

OTHER PUBLICATIONS

A.L. Busk et al., "The Storage Server as Virtual Volume Manager", IEEE Symposium on Mass Storage Systems, pp. 79–86, 1993.

Sam Coleman, Steve Miller, "Mass Storage System Reference Model", Version 4, Developed by the IEEE Technical Committee on Mass Storage Systems and Technology, 38 pages, May 1990.

J.L. Sloan, B.T. O'Lear, D.L. Kitts and B.L. Irwin, MaS-SIVE™. The Mass Storage System IV Enterprise. Proceedings of the IEEE. vol. 81, No. 4, pp. 621–630, Apr. 1993.

R. Baird, "Virtual Storage Architecture Guide", IEEE Symposium on Mass Storage Systems, pp. 312–326, 1995.

Garth A. Gibson, "Network Attached Secure Disks (NASD)", ARPA ITO Scalable Systems and Software, pp. 1–24, May 4, 1997.

M. Jander, "Launching Storage–Area Net", Data Communications, US, McGraw Hill, New York, vol. 27, No. 4, Mar. 21, 1998, pp. 64–72.

B. Christensen, "Building A Storage–Area Network–SANS Boost Performance, Reliability and Scalability of the Critical Link Between Servers and Storage Devices", Data Communications, US, McGraw Hill, New York, vol. 27, No. 6, Apr. 21, 1998, pp. 67–70, 74.

David Nagle, Garth Gibson, Greg Ganger & Bill Courtright. Networking for Network–Attached Storage. NADS/NSIC Networking Workshop, pp. 1–18, Sep. 1, 1998.

Shared Virtual Storage System, System Description, 1979, pp. 1–14, Masstor Systems Corporation, Sunnyvale, California.

Shared Virtual Storage System, System Overview, 1980, pp. 1–60, Masstor Systems Corporation, Sunnyvale, California.

Digest of Papers, The Gap Between MSS Products and User Requirements, Fourth IEEE Symposium on Mass Storage Systems, Apr. 15–17, 1980, pp. 1–76, Nat'l Center for Atmospheric Research, Boulder, Colorado.

FPEXEC File Processor Executive Program Logic Manual, Oct. 18, 1982, p. 1–177, MASSTOR Systems Corp., Sunnyvale, California.

Waddell, J.M. and Way, D.L., Channel Scheduling By A Control Unit, IBM Technical Disclosure Bulletin, vol. 17, No. 9, Feb. 1975.

Liptay, J.S., Structural Aspects of the System/360 Model 85, IBM Systems Journal, pp. 1–14, vol. 7, No. 1, 1968.

Meade, Robert M., How a cache memory enhances a computer's performance, Electronics, 1–17–72, pp. 58–63.

Smith, Alan Jay, Directions For Memory Hierarchies And Their Components: Research And Development, 1978.

Christman, R.D., Collins, M.W., Devaney, M.A., Willbanks, E.W., A Network File Storage System, UC–32, 7–81, pp. 1–14.

Reference Manual for IBM 3830 Storage Control Model 1 and IBM 3330 Disk Storage, GA26–1592–5, File No. S360/S370–07, pp. 1–101.

Porter, James N., The Disk Drive Industry, IEEE Transactions on Magnetics, vol. MAG–14, No. 4, Jul. 1978, pp. 149–153.

Puthoff, S.H., Technical Innovations In Information Storage And Retrieval, IEEE Transactions On Magnetics, vol. MAG–14, No. 4, Jul. 1978, pp. 143–148.

Boggs, Jr., Virtual Input/Output channels For A Digital Computer, IBM Tech. Disc. Bull., vol. 20, No. 1, Jun. 1977, pp. 110–112.

Nishimukai, T., Tsujioka, S., Kadono, S., Chiba, T., Universal IO Device Controller By Using Programmable Logic Arrays, IEEE 1978, pp. 477–480.

Christman, R.D., Collins, M.W., Devaney, M.A., Willbanks, E.W., A Network File–Storage System, Los Alamos Scientific Laboratory, LA–8887–MS, pp. 1–14.

Chorn, G.E., Christman, R.D., Klingner, C.T., The Standard File Transport Protocol, LA–7388–MS Informal Report UC–32 Issued: Aug. 1978.

Mitchell, Jr., M.J., Diskette Load/Dump Control, IBM Tech. Disc. Bull. vol. 20, No. 4, Sep. 1977, pp. 1359–1361.

Collins, M.W., Mass Storage at LASL, Los Alamos Scientific Laboratory, pp. 95–112.

The IBM Mass Memory System, Ampex Corporation, Sunnyvale, CA, pp. 1–30.

Crittendon, Jr., W.C., Operational Characteristics Of The NCAR Mass Storage Device, pp. 48–50.

Howie, Jr., H. Robert, More Practical Applications Of Trillion–Bit Mass Storage Systems, Advanced Systems Dept./Ampex Corp., Sunnyvale, CA.

Shell Oil Company, Purchase Order No. SH–84378–JLH, Dec. 18, 1978 w/Agreement Between Masstor Systems Corporation and Shell Oil Co. as an attachment.

Masstor, MC Series Computer, Specifications.

Blood, P.M., Christman, R.D., Collins, M.W., Willbanks, E.W., Common File System Specifications, LA–7065–MS, Informal Report, 09–77, pp. 1–15.

IBM 3850 Mass Storage System (MSS) Introduction And Preinstallation Planning, GA32–0038–1, File No. S370–07.

IBM System/370 Principles of Operation, GA22–7000–8, File No. S370–01.

IBM 3850 Mass Storage System (MSS) Principles of Operation: Theory, GA32–0035–1, File No. S370–07.

* cited by examiner

INTELLIGENT DATA STORAGE MANAGER

This is a continuation divisional of application(s) Ser. No. 09/232,431 filed on Jan. 15, 1999 now U.S. Pat. No. 6,330,621.

FIELD OF THE INVENTION

This invention relates to data storage subsystems and, in particular, to a dynamically mapped virtual data storage subsystem which includes a data storage manager that functions to combine the non-homogeneous physical devices contained in the data storage subsystem to create a logical device with new and unique quality of service characteristics that satisfy the criteria for the policies appropriate for the present data object.

PROBLEM

It is a problem in the field of data storage subsystems to store the ever increasing volume of application data in an efficient manner, especially in view of the rapid changes in data storage characteristics of the data storage elements that are used to implement the data storage subsystem and the increasingly specific need of the applications that generate the data.

Data storage subsystems traditionally comprised homogeneous collections of data storage elements on which the application data was stored for a plurality of host processors. As the data storage technology changed and a multitude of different types of data storage elements became available, the data storage subsystem changed to comprise subsets of homogeneous collections of data storage elements, so that the application data could be stored on the most appropriate one of the plurality of subsets of data storage elements. Data storage management systems were developed to route the application data to a selected subset of data storage elements and a significant amount of processing was devoted to ascertaining the proper data storage destination for a particular data set in terms of the data storage characteristics of the selected subset of data storage elements. Some systems also migrate data through a hierarchy of data storage elements to account for the timewise variation in the data storage needs of the data sets.

In these data storage subsystems, the quality of service characteristics are determined by the unmodified physical attributes of the data storage elements that are used to populate the data storage subsystem. One exception to this rule is disclosed in U.S. Pat. No. 5,430,855 titled "Disk Drive Array Memory System Using Nonuniform Disk Drives," which discloses a data storage subsystem that uses an array of data storage elements that vary in their data storage characteristics and/or data storage capacity. The data storage manager in this data storage subsystem automatically compensates for any nonuniformity among the disk drives by selecting a set of physical characteristics that define a common data storage element format. However, the data storage utilization of the redundancy groups formed by the data storage manager is less than optimal, since the least common denominator data storage characteristics of the set of disk drives is used as the common disk format. Thus, disk drive whose data storage capacity far exceeds the smallest capacity disk drive in the redundancy group suffers from loss of utilization of its excess data storage capacity. Therefore, most data storage subsystems do not utilize this concept and simply configure multiple redundancy groups, with each redundancy group comprising a homogeneous set of disk drives. A problem with such an approach is that the data storage capacity of the data storage subsystem must increase by the addition of an entire redundancy group. Furthermore, the replacement of a failed disk drive requires the use of a disk drive that matches the characteristics of the remaining disk drives in the redundancy group, unless loss of the excess data storage capacity of the newly added disk drive were incurred, as noted above.

Thus, it is a prevalent problem in data storage subsystems that the introduction of new technology is costly and typically must occur in fairly large increments, occasioned by the need for the data storage subsystem to be comprised of homogeneous subset of data storage devices, even in a virtual data storage subsystem. Therefore, data administrators find it difficult to cost effectively manage the increasing volume of data that is being generated in order to meet the needs of the end users' business. In addition, the rate of technological innovation is accelerating, especially in the area of increases in data storage capacity and the task of incrementally integrating these new solutions into existing data storage subsystems is difficult to achieve.

SOLUTION

The above described problems are solved and a technical advance achieved by the present intelligent data storage manager that functions to combine the non-homogeneous physical devices contained in a data storage subsystem to create a logical device with new and unique quality of service characteristics that satisfy the criteria for the policies appropriate for the present data object. In particular, if there is presently no logical device that is appropriate for use in storing the present data object, the intelligent data storage manager defines a new logical device using existing physical and/or logical device definitions as component building blocks to provide the appropriate characteristics to satisfy the policy requirements. The intelligent data storage manager uses weighted values that are assigned to each of the presently defined logical devices to produce a best fit solution to the requested policies in an n-dimensional best fit matching algorithm. The resulting logical device definition is then implemented by dynamically interconnecting the logical devices that were used as the components of the newly defined logical device to store the data object.

DETAILED DESCRIPTION

Figure 1:
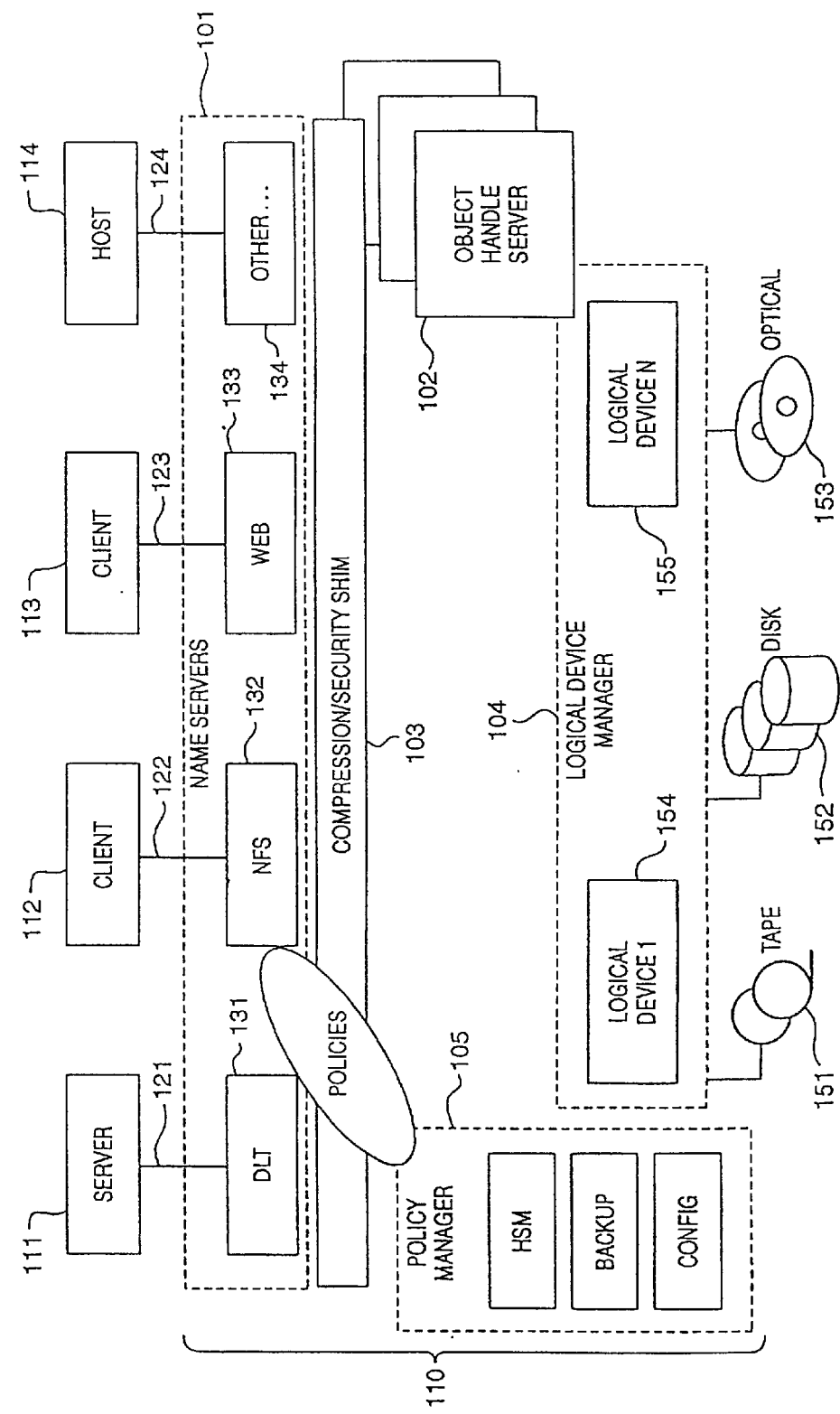
FIG. 1 illustrates in block diagram form the overall architecture of a data storage subsystem in which the present intelligent data storage manager is implemented.

FIG. 1 illustrates in block diagram form the overall architecture of a data storage subsystem 100 in which the present intelligent data storage manager 110 is implemented. The data storage subsystem is connected to a plurality of host processors 111–114 by means of a number of standard data channels 121–124. The data channels 121–124 are terminated in a host interface 101 which provides a layer of name servers 131–134 to present virtual implementations of existing defined physical device interfaces to the host processors 111–114. As far as the host processors 111–114 are concerned, the name servers 131–134 implement a real physical device. The name servers 131–134 convert the user data received from the host processor 111–114 into a user data object which can be either converted into a canonical format or left in binary format. The object handle server maps the object handle to logical device addresses and allows multiple instances of a data object. The object handle server 102 maps the user data object into a data space for storage. The mapping is determined by the policies programmed into the policy manager 105 of the data storage subsystem 100 and subject to security layer 103. The persistent storage for the object space is determined by the logical device manager 104 which allocates or creates a logical device based upon policies for storing the user data object. A logical device is a composite device and can consist of a real physical device such as a tape 151, a disk 152, optical disk 153, another logical device, such as Logical Device 1 which comprises a RAID 5 disk array 154, Logical Device N which comprises middleware software 155 that accesses another logical device, such as access of a logical device over a network connection, or combinations of the above. The logical device definition abstracts the nature of the real device associated with the persistent storage. The changes implemented in the technology of the persistent storage are thereby rendered transparent to the host application.

If there is presently no logical device that satisfies the criteria for the policies appropriate for a user data object, the logical device manager 104 creates a new logical device definition with the appropriate data storage characteristics to satisfy the policy requirements using existing physical and/or logical device definitions as component building blocks. The logical device manager 104 uses weighted values that are assigned to each of the presently defined logical devices to produce a best fit solution to the requested policies in an n-dimensional best fit matching algorithm. Thus, the intelligent data storage manager 110 maps the virtual device to the user data object rather than mapping a data object to a predefined data storage device. The various data storage attributes that are used by the intelligent data storage manager 110 to evaluate the appropriateness of a particular virtual device include, but are not limited to: speed of access to first byte, level of reliability, cost of storage, probability of recall, and expected data transfer rate. The logical device manager 104 stores the mapping data which comprises a real time definition of the available storage space in the data storage subsystem 100. Once one of the current logical device definitions meet the criteria required by a data object, the logical device manager 104 either allocates space on an existing instance of a logical device of that type or creates a new instance of that type of logical device.

POLICY ATTRIBUTES

The policy attributes and the potential algorithms that are used to map user requirements to storage devices are managed by the intelligent storage manager 110. A typical general set of attributes for storage devices is shown in Table 1:

TABLE 1

Policy Attributes

| Name of Attribute | Range of Values (Dimension) |
| --- | --- |
| Cost per MB (lg) | $0.0001 to $1000.00 |
| Time to first byte (lg) | Ns to days |
| Random read | 0.0001 to 1000 MB/sec |
| Random write | 0.0001 to 1000 MB/sec |
| Sequential read | 0.0001 to 1000 MB/sec |
| Sequential write | 0.0001 to 1000 MB/sec |
| Sequential (tape) or random (disk) storage or recall | 0 to 10 (where: 0 = sequential, 10 = random) |
| Size (lg) | Bytes to petabytes |
| Probability of recall | 0 to 10 (where: 0 = lowest, 10 = highest) |
| Virtual or real Device | yes/no |
| Level of reliability | 0 to 10 (where: 0 = minimum, 10 = 100%) |
| Others to be defined. . . | |

Each of these attributes has a range or dimension of "values". Each dimension needs to be relatively uniform in its number scheme. For example, each dimension could have a numeric value for 0.0 to 10.0. Some dimensions need to be logarithmic (lg) because of the inherent nature of the dimension. For example, Cost per MB can be defined as a logarithmic dimension that runs from the $0.001 for tape storage to $10 for RAM. So one approach is to do a distance calculation of the difference between the customer's policy requirements and each storage device's policy attributes. In addition, levels of priority among attributes can be specified since certain dimensions may be more important than others (reliability, for example). When the intelligent storage manager 110 must resolve between conflicting priority levels, the logical storage manager 104 tries to find ways to combine single devices into an optimal, logical device using logical combining operators.

Operation of the Intelligent Data Storage Manager

Figure 2:
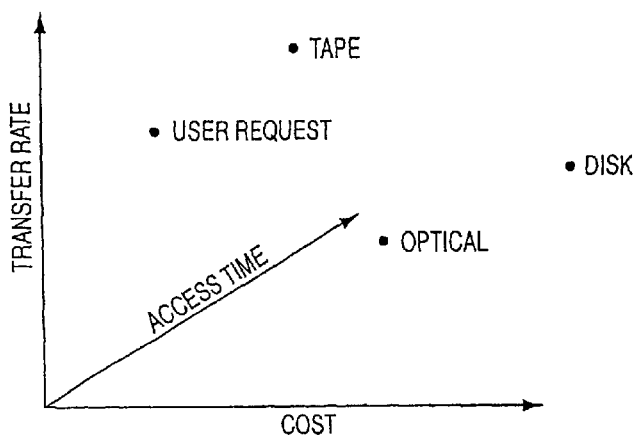
FIG. 2 illustrates a three-dimensional chart of the operating environment of the present intelligent data storage manager.
Figure 3:
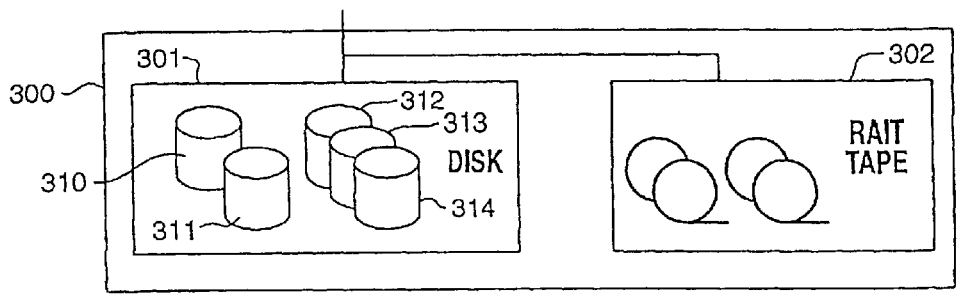
FIG. 3 illustrates one example of a virtual device that can be configured by the present intelligent data storage manager.

The present intelligent data storage manager 110 is responsive to one of the host processors 111 initiating a data write operation by transmitting a predefined set of commands over a selected one of the communication links to the data storage subsystem 100. These commands include a definition of the desired device on which the present data object is to be stored, typically in terms of a set of data storage characteristics. FIG. 2 illustrates a three-dimensional (of the above-noted multiple dimensions) chart of the operating environment of the present intelligent data storage manager 110 and the location of the host specified data storage device with respect to this environment. In particular, as mapped in a Cartesian coordinate system, the cost, data transfer rate, and data access time comprise the three axes used to measure the performance characteristics of the various physical 151–153 and virtual 154–155 devices of the data storage subsystem 100. As shown in FIG. 3, the standard tape 151, disk 152, and optical 153 devices each have a set of defined characteristics that can be mapped to the three-dimensional space of FIG. 2. The user has requested that their data be stored on a device, whose data storage characteristics do not match the data storage characteristics of any of the devices presently defined in the data storage subsystem 100. The desired data storage characteristics are shown mapped as a locus in the three-dimensional space in FIG. 2. The intelligent data storage manager 110 must therefore map the existing set of physical devices that are contained in the data storage subsystem 100 to satisfy the desired set of data storage characteristics defined by the user. This problem comprises a three-dimensional best fit mapping process wherein the set of available physical and virtual devices are mapped to match or at least approximate the desired set of data storage characteristics. This is accomplished by creating a composite virtual device that implements the defined desired data storage characteristics. For example, assume that the user has requested a data storage device that has a 20 MB/sec read performance and the data storage subsystem 100 is equipped with 5 MB/sec tape drives as one of the types of physical devices. The intelligent data storage manager 110 can create a 20 MB/sec data storage device by configuring a Redundant Array of Inexpensive Tape drives (RAIT) to connect a plurality of the existing tape drives 151 in parallel to thereby achieve the desired data throughput.

Examples of Operation of the Intelligent Data Storage Manager

There are many instances of data file storage where the needs of the application and/or user do not correspond to the reality of the data storage characteristics of the various data storage elements 151–153 and virtual data storage elements 154–155 that are available in the data storage subsystem 100. For example, the application "video on demand" may require a high reliability data storage element and fast access to the initial portion of the file, yet not require fast access for the entirety of the file since the data is typically read out at a fairly slow data access rate. However, the required data transfer bandwidth may be large, since the amount of data to be processed is significant and having a slow speed access device as well as a narrow bandwidth would result in unacceptable performance. Furthermore, the cost of data storage is a concern due to the volume of data. The intelligent data storage manager 110 must therefore factor all of these data storage characteristics to determine a best fit data storage device or devices to serve these needs. In this example, the defined data storage characteristics may be partially satisfied by a Redundant Array of Inexpensive Tapes since the reliability of this data storage device is high as is the data bandwidth, yet the cost of implementation is relatively low, especially if the configuration is a RAIT-5 and the data access speed is moderate. In making a determination of the appropriate data storage device, the intelligent data storage manager 110 must review the criticality of the various data storage characteristics and the amount of variability acceptable for that data storage characteristic.

Defining Attribute Values

All devices support some form of quality of service, which can be described as attributes with certain fixed values. For example, they cost $xxx per megabyte of data or have nnn access speed. The intelligent storage manager 110 provides an algorithmic way to use these attributes to determine the perfect device, as specified by user policy. In some cases, the perfect device is a logical device that is constructed when the intelligent storage manager 110 rank orders the distance between 1) how the user would like to have data stored and 2) the storage devices that are available. This logical device can span both disk and tape subsystems and, therefore, blurs the distinction between disk and tape.

Figure 4:
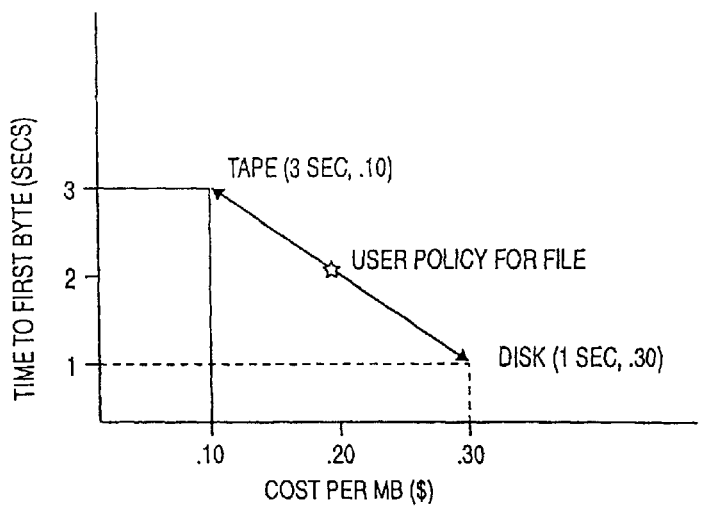
FIG. 4 illustrates a three-dimensional chart of a user policy that must resolve priorities between two attributes: Cost per MB, and Time to First Byte.

The diagram of FIG. 4 shows an example of a user policy that must resolve priorities between two attributes: Cost per MB, and Time to First Byte. To resolve this, the intelligent storage manager 110 could create a logical device that is the mixture of disk and tape that best conforms to the specific policies the user has requested. In this example, some data could be stored on disk for quick access and some data could be stored on tape for lower cost of storage. Or the intelligent storage manager 110 could create a policy that migrates a small file between disk and tape over time: after a week the file would be transferred to tape to lower storage cost.

Table 2 provides a more complex comparison of device attributes versus attributes defined through user policy. In this example, the set of attributes of the following storage subsystems: single disk, RAID, single tape drive, and RAIT are listed. The intelligent storage manager 110 determines an optimal storage solution by doing a distance calculation between 1) the set of attributes for each device and 2) the set of attributes for a file (defined through user policy).

For example, the calculation below denotes the vector for point P by [x1(P), x2(P), x3(P)]. Then the distance between points 1 and 2 is $$\sqrt{[(x1-x2)^2+(y1-y2)^2+(z1-z2)^2]}$$

Where
  x1 is the attribute value defined by user policy.
  x2 is the attribute value defined for the device.

This example is for three dimensions. To extend it to more dimensions, take the difference between corresponding components of the two vectors, square this difference, add this square to all the other squares, and take the square root of the sum of the squares. Of course, you don't need to do the square root if you're simply looking for the point closest to a give point.

TABLE 2

Device attributes vs. user-defined policy

| Device | Cost/ MB | Time to first byte | MB/sec read | MB/sec write | Sequential or Random | Reliability |
|---|---|---|---|---|---|---|
| Disk | 0.15 | 12 ms | 3 MB/sec | 3 MB/sec | 5 | 1 |
| RAID | 10.00 | 6 ms | 80 MB/sec | 20 MB/sec | 3 | 3 |
| Tape | .001 | 30 sec | 5 MB/sec | 5 MB/sec | 0 | 2 |
| RAIT | .005 | 40 sec | 20 MB/sec | 20 MB/sec | 0 | 4 |
| User-defined policy (per attribute) | | | | | | |
| File | .01 | 1 sec or less | .1 MB/sec or less | .1 MB/sec or less | 0 | 3 |

In the present example, the realized data storage device can be a composite device or a collection of composite devices. For example, the video on demand file data storage requirements can be met by the virtual device illustrated in FIG. 3. The virtual device 300 can comprise several elements 301, 302, each of which itself comprises a collection of physical and/or virtual devices. The virtual device 300 comprises a first device 301 which comprises a set of parallel connected disk drives 310–314 that provides a portion of the data storage capability of the virtual device 300. These parallel connected disk drives 310–314 provide a fast access time for the application to retrieve the first segment of the video on demand data to thereby provide the user with a fast response time to the file request. The bulk of the video on demand data file is stored on a second element 302 that comprises a Redundant Array of Inexpensive Tapes device that implements a RAIT-5 storage configuration. The relative data storage capacity of the two data storage elements 301, 302 is determined by the amount of data that must be provided to the user on a priority basis and the length of time before the remainder of the file can be staged for provision to the user.

Time Analysis

The data storage manager 110 implements devices that support some form of quality of service. These attributes have some type of fixed value: they cost so much—they have XX access speed. The data storage manager 110 can also rank order the distances between how the user wishes to have a data file stored compared to the storage devices that are in the data storage subsystem 100. From this the data storage manager 110 can also come up with some alternative storage methods—for example, the data storage manager 110 can do a mixture of disk and tape to achieve the qualities that the user is looking for. The data storage manager 110 can put some of the data file on disk for quick access and some of it on tape for cheap storage as noted above. Another alternative factor is if there is a file that the user wants stored at a certain $$ per megabyte, it can be migrated from disk to tape over a certain period of weeks and the average cost of storage complies with the user policy definition. So, the data storage manager 110 must evaluate quickly what devices are available and the data storage manager 110 compares how the user wants to store the data file. If the data storage manager 110 doesn't have a perfect match, the mixtures of devices are rank ordered and investigated to try and achieve the policy that is defined by the user.

Summary

The intelligent data storage manager functions to combine the non-homogeneous physical devices contained in a data storage subsystem to create a logical device with new and unique quality of service characteristics that satisfy the criteria for the policies appropriate for the present data object. The intelligent data storage manager uses weighted values that are assigned to each of the presently defined logical devices to produce a best fit solution to the requested policies in an n-dimensional best fit matching algorithm. The resulting logical device definition is then implemented by dynamically interconnecting the logical devices that were used as the components of the newly defined logical device to store the data object.

What is claimed:

1. A data storage manager operational in a data storage subsystem that uses a plurality of data storage elements to store data thereon for a plurality of host processors that are connected to said data storage subsystem, comprising:

means for storing a set of logical data storage device definitions that are created from said plurality of data storage elements;

means for identifying a set of data storage characteristics appropriate for a present data object;

means for comparing said identified set of data storage characteristics with said stored set of logical data storage device definitions;

means, responsive to a failure to match said identified set of data storage characteristics with a single one of said stored set of logical data storage device definitions, for creating a new logical device definition using a plurality of said stored set of logical data storage device definitions; and means for storing said present data object on interconnected ones of said plurality of data storage elements that correspond to said new logical device definition.

2. The data storage manager of claim 1 wherein said means for storing comprises:

means for allocating space on an existing instance of said interconnected ones of said plurality of data storage elements that correspond to said new logical device definition.

3. The data storage manager of claim 1 wherein said means for storing comprises:

means for creating a new instance of said interconnected ones of said plurality of data storage elements that correspond to said new logical device definition.

4. The data storage manager of claim 1 wherein said means for storing comprises:

means for storing data indicative of a plurality of data storage attributes from the class of data storage attributes comprising: speed of access to first byte, level of reliability, cost of storage, probability of recall, and expected data transfer rate.

5. A method of operating a data storage manager operational in a data storage subsystem that uses a plurality of data storage elements to store data thereon for a plurality of host processors that are connected to said data storage subsystem, comprising the steps of:

storing a set of logical data storage device definitions that are created from said plurality of data storage elements;

identifying a set of data storage characteristics appropriate for a present data object;

comparing said identified set of data storage characteristics with said stored set of logical data storage device definitions;

creating, in response to a failure to match said identified set of data storage characteristics with a single one of said stored set of logical data storage device definitions, a new logical device definition using a plurality of said stored set of logical data storage device definitions; and storing said present data object on interconnected ones of said plurality of data storage elements that correspond to said new logical device definition.

6. The method of operating a data storage manager of claim 5 wherein said step of storing comprises:

allocating space on an existing instance of said interconnected ones of said plurality of data storage elements that correspond to said new logical device definition.

7. The method of operating a data storage manager of claim 5 wherein said step of storing further comprises:

creating a new instance of said interconnected ones of said plurality of data storage elements that correspond to said new logical device definition.

8. The method of operating a data storage manager of claim 5 wherein said step of storing comprises:

storing data indicative of a plurality of data storage attributes from the class of data storage attributes comprising: speed of access to first byte, level of reliability, cost of storage, probability of recall, and expected data transfer rate.

9. A data storage manager operational in a data storage subsystem that uses a plurality of data storage elements to store data thereon for a plurality of host processors that are coupled to said data storage subsystem, comprising:

means for maintaining at least one storage attribute associated with a logical data storage device, said logical data storage device comprising at least a portion of said plurality of data storage elements;

means for identifying at least one storage attribute appropriate for a present data object;

means for comparing said identified storage attribute with said maintained storage attribute;

means, responsive to a failure to match said identified storage attribute with said maintained storage attribute, for creating a new logical data storage device; and means for storing said present data object on that portion of said plurality of data storage elements that correspond to said new logical data storage device.

10. The data storage manager of claim 9, wherein said new logical data storage device comprises both physical and logical data storage elements.

11. A data storage manager operational in a data storage subsystem that uses a plurality of data storage elements to store data thereon for a plurality of host processors that are coupled to said data storage subsystem, comprising:

means for maintaining at least one storage attribute associated with a logical data storage device, said logical data storage device comprising at least a portion of said plurality of data storage elements;

means for identifying at least one storage attribute appropriate for a present data object;

means for comparing said identified storage attribute with said maintained storage attribute;

means, responsive to a match of said identified storage attribute with said maintained storage attribute, for creating a new instantiation of said logical data storage device; and means for storing said present data object on that portion of said plurality of data storage elements that correspond to said new instantiation of said logical data storage device.

12. The data storage manager of claim 11, wherein said new instantiation of said logical data storage device comprises both physical and logical data storage elements.

13. In a data storage manager operational in a data storage subsystem that uses a plurality of data storage elements to store data thereon for a plurality of host processors that are coupled to said data storage subsystem, a method comprising the steps of:

maintaining at least one storage attribute associated with a logical data storage device, said logical data storage device comprising at least a portion of said plurality of data storage elements;

identifying at least one storage attribute appropriate for a present data object;

comparing said identified storage attribute with said maintained storage attribute;

creating, responsive to a failure to match said identified storage attribute with said maintained storage attribute, a new logical data storage device; and storing said present data object on that portion of said plurality of data storage elements that correspond to said new logical data storage device.

14. A data storage manager operational in a data storage subsystem that uses a plurality of data storage elements to store data thereon for a plurality of host processors that are coupled to said data storage subsystem, comprising:

maintaining at least one storage attribute associated with a logical data storage device, said logical storage device comprising at least a portion of said plurality of data storage elements;

identifying at least one storage attribute appropriate for a present data object;

comparing said identified storage attribute with said maintained storage attribute;

creating, responsive to a match of said identified storage attribute with said maintained storage attribute, a new instantiation of said logical data storage device; and storing said present data object on that portion of said plurality of data storage elements that correspond to said new instantiation of said logical data storage device.

15. The data storage manager of claim 1 wherein at least some of the plurality of data storage elements are non-homogeneous physical devices, and portions of a plurality of the non-homogeneous physical devices are logically associated in creating the new logical device definitions.

16. The data storage manager of claim 9 wherein at least some of the plurality of data storage elements are non-homogeneous physical devices, and the new logical data storage device is defined using portions of a plurality of the non-homogeneous physical devices.

17. The data storage manager of claim 11 wherein at least some of the plurality of data storage elements are non-homogeneous physical devices, and the new instantiation of the logical data storage device is defined using portions of a plurality of the non-homogeneous physical devices.

* * * * *